United States Patent [19]

Kimball et al.

[11] 4,373,082

[45] Feb. 8, 1983

[54] CURATIVE FOR A TWO COMPONENT ISOCYANATE ADHESIVE AND SAID ADHESIVE

[75] Inventors: Michael E. Kimball, Ashland; Marvin T. Randleman, New London, both of Ohio

[73] Assignee: The Goodyear Tire & Rubber Company, Akron, Ohio

[21] Appl. No.: 321,660

[22] Filed: Nov. 16, 1981

[51] Int. Cl.$^3$ .............................................. C08G 18/32
[52] U.S. Cl. ...................................... 528/60; 252/182; 528/44; 528/76; 528/77
[58] Field of Search ........................... 528/60, 76, 77; 252/182

[56] References Cited

U.S. PATENT DOCUMENTS

| | | | |
|---|---|---|---|
| 3,663,513 | 5/1972 | Kazama et al. | 260/75 NT |
| 3,666,835 | 5/1972 | Schloss | 260/858 |
| 3,812,003 | 5/1974 | Larson et al. | 428/423.7 |
| 3,935,051 | 1/1976 | Bender et al. | 528/48 |

*Primary Examiner*—H. S. Cockeram
*Attorney, Agent, or Firm*—J. D. Wolfe

[57] ABSTRACT

A curative for a two component isocyanate or polyurethane adhesive composed of a prepolymer component having about 3 to 15 percent free isocyanate, said curative comprising at least one polyol of about 400 to 6000 molecular weight and a polyamine with at least part of said polyol and said diamine being reacted with an organic polyisocyanate to form micelles that exhibit upon NMR examination strong urea peaks and weak urethane peaks. The curative is useful to make an adhesive that is particularly useful for adhering to metals and polyesters.

7 Claims, No Drawings

CURATIVE FOR A TWO COMPONENT ISOCYANATE ADHESIVE AND SAID ADHESIVE

TECHNICAL FIELD

This invention relates to an improved curative for a two component isocyanate or polyurethane adhesive and to said adhesive. More particularly this invention relates to an improved curative that yields an adhesive having characteristics similar to one containing finely powdered fumed silica as a filler. More specifically this invention relates to an improved curative containing micelles of a polyol reaction product with an isocyanate terminated polyurea which upon NMR examination exhibits very strong urea peaks and weak urethane peaks.

BACKGROUND

The prior art two component adhesives composed of a prepolymer component and a curative component usually have been mixed at ratios of at least 4:1, and in many instances much higher. Also because the two components are mixed at such relatively high ratios those of ordinary skill in the art have used fillers to aid in controlling the ratio and to control sag resistance but this technique resulted in the physical properties of the adhesives varying in proportion to the fillers added to the adhesive. Also the aged curative is relatively moisture sensitive.

Recent discoveries have provided a two component sag resistant adhesive where the components are mixed at 1:2 to 2:1 ratio with a gel time of 2 to 120 minutes at 24° C., relatively low viscosity and good bonding ability to metal and polyester substrates.

The prior art two component adhesives used in the polyester impregnated fiberglass molded products industry generally have contained high filler loadings with powdery fumed silica being greatly preferred as a filler. With the energy crisis and with greatly increasing fuel costs the price of this preferred filler of powdery fumed silica has increased in like manner. Thus it is desirable to replace powdery fumed silica in some manner with other fillers or eliminate filler altogether as the powdery fumed silica affects the adhesive viscosity and its sag resistance.

DISCLOSURE AND PRACTICE OF THE INVENTION

We have discovered that powdery fumed silica can be replaced in two component adhesives without the addition of other filler or fillers and most of the properties contributed by the filler be retained provided the curative is prepared in a manner to contain micelles of polyurea polyol.

The curative component for use with the prepolymer component of the two component adhesive can be made by forming a blend of 1 to 10 equivalents of at least one polyol of about 400 to about 4000 molecular weight and higher with $1 \times 10^{-3}$ to 1 equivalents of a diamine such as ethylene diamine or hydrazine, then reacting at least part of said polyol and said diamine with an organic polyisocyanate such as toluene diisocyanate at 32° to 82° C. to form micelles. These micelles upon examination with NMR exhibit strong urea peaks and weak urethane peaks as described in the method shown in *Makromol Chemie*, 78, pages 146–156 (1964). Since NMR analysis of the micelles indicates they are composed of hard segments of essentially high melting insoluble polyurea and solubilizing segments of polyol and we have discovered that these micelles exhibit some of the ability of powdery fumed silica to act as a reinforcing filler at the same time means is provided to adjust and control the viscosity of the curative within a more desirable range of about 8000±500 centistokes as measured at 25° C. with a #6 spindle at 10 rpm with a Brookfield viscometer. This curative is less sensitive to moisture. Also this method of producing the curative gives a reduction in time required to produce said curative relative to the method where silica is used. Hence the raw materials are changed and the time of preparation is shorter to give an adhesive having satisfactory properties for use in the molded polyester impregnated fiberglass products industry with an economic advantage, or polyurethane products including RIM products per se and fiber loaded polyurethanes. Also the adhesive made from the improved curative of this invention and the prepolymer component has improved thixotropic properties and better sag resistance relative to silica loaded adhesive.

The prepolymer composition or polyisocyanate adhesive component is made in the well known manner such as described in the Newell R. Bender and William M. Larson U.S. Pat. Nos. 3,812,003 issued May 21, 1974 and 3,935,051 issued Jan. 27, 1976 where about 100 parts of a reactive hydrogen containing material having a molecular weight of 700 to 4500 and preferably from about 1000 to 3500 is selected from the polyester amides, polyester polyols and the polyether polyols with about 30 to 120 parts of an organic polyisocyanate preferably in the presence of about 5 to 200 parts of an inert powdery filler and a polyurethane catalyst of the metallic type such as the salts of tin, mercury and lead and the tertiary amines, such as triethylene diamine, dimethyl piperazine and the other well known tertiary amines. It should be appreciated that the curative of this invention reduces the need for the filler.

A representative prepolymer can be formed by mixing and reacting a thoroughly degassed mixture of 100 parts of polypropylene glycol of about 2000 molecular weight, 60 parts of a filler, such as silicates of talc and clay, calcium carbonate, whiting, carbon black, etc. with 50 to 70 parts of toluene diisocyanate or methane di(phenyl isocyanate) of monomeric or polymeric type depending on the percent free isocyanate desired. Usually the reaction time at elevated temperature is chosen to give a prepolymer in one to several hours. These prepolymers usually have from 3 to 15 percent of free NCO with 7 to 10 percent being preferred. Those of ordinary skill in this art appreciate other polyols such as polytetramethylene ether glycol, hydroxyl terminated butadiene or the related dienes and the copolymers of these dienes with monomers such as styrene or acrylonitrile can be used to make prepolymers useful in this invention. Likewise the polyester polyols such as the adipates, azelates, phthalates of the glycols or triols of ethylene, propylene, butylene, amylene, hexylene and higher can be used to make prepolymers useful in this invention.

The curative component can use any of the polyols of about 400 to about 4000, and preferably 500 to 1000, molecular weight with two or more polyols being preferred to give the desired range of properties.

The nature of this invention and its advantages can be more readily appreciated by reference to the following representative and illustrative examples wherein all parts and percentages are by weight unless indicated otherwise.

EXAMPLE 1

A series of curative blends were made using the recipes listed in Table I wherein the control was the curative of the prior art.

To the degassed polyhydroxy compound, viz the Pluracol-355, the ethylene diamine (EN) and the toluene diisocyanate (TDI) were added and reacted at 68° C. to give a curative having the viscosity indicated.

The control was prepared by adding the powdered fumed silica, viz Aero-Sil 200, to the degassed polyhydroxyl compound and intimately mixed to give a curative of the viscosity shown. A comparison of the curatives made by recipes Nos. 1, 2 and 3 with the control demonstrates how the viscosity is increased relative to the control.

TABLE I

| Recipe No. | Control | 1 | 2 | 3 |
|---|---|---|---|---|
| Pluracol-355 | 200 | 200 | 200 | 200 |
| Aero-sil-200 | 5 | — | — | — |
| EN |  | .1 | .15 | .075 |
| TDI |  | 2.5 | 2.5 | 2.5 |
| Viscosity at 77° F. | 6700 | 10,000 | 13,000 | 8000 |

These curatives were then mixed with the prepolymer composition or polyisocyanate adhesive component in ratios to give a NCO/OH ratio of 4 to 1 to produce the adhesive. The resulting adhesives were used to bond standard polyester impregnated fiberglass specimens in a cross pattern and then the cured cross bonded specimens were tested for bond strength. The adhesives produced by recipes Nos. 1, 2 and 3 gave bonds equivalent to or better than that of the control.

Representative of other polyamines that can be used to make the curative of the instant invention are the aliphatic ones such as hydrazine, ethylene diamine, propylene diamine, butane diamine and hexane diamine, viz the diamine of 2 to 20 carbon atoms and preferably 2 to 12 carbon atoms, the aromatic one such as toluene diamine, or xylene diamine and the cycloaliphatic ones such as piperazine, cyclohexane diamine, methane dicyclohexane diamine and isophorone diamine.

Representative of the organic polyisocyanate that can be used to make the curatives of the instant invention are toluene diisocyanate, methane di(phenyl isocyanate), (MDI), polymeric MDI, cyclohexane diisocyanate, hydrogenated MDI, e.g. $H_{12}$MDI isophorone diisocyanate, and hexane diisocyanate.

EXAMPLE 2

The ingredients of Table I were added, mixed and reacted according to the procedure of example 1 to produce curatives having the viscosities shown.

TABLE

| Ingredients | Curative No 4 | Curative No 5 | Curative No 6 |
|---|---|---|---|
| Pluracol-355 | 200 | 200 | 200 |
| Hexamethylene diamine | 0.15 |  |  |
| Hydrazine |  | 0.03 |  |
| Toluene diamine |  |  | 0.13 |
| Toluene diisocyanate | 2.5 | 2.5 | 2.5 |
| Viscosity @ 77° F. | 7,800 | 8,200 | 8,400 |

The curatives No. 4, 5 and 6 were mixed one part with four parts of a commercial isocyanate adhesive component to form the adhesive. The adhesive was used to bond standard SMC specimen to SMC specimens i.e. polyester impregnated fiberglass, together and acceptable adhesive bonds were obtained.

Satisfactory adhesive bonds were obtained when other polyisocyanates such as methane di(phenyl isocyanate), polymeric methane di(phenyl isocyanate), cyclohexane diisocyanate and hydrogenated methane di(phenyl isocyanate) were used in place of toluene diisocyanate to make the curative.

We claim:

1. A curative component for a two component isocyanate adhesive composed of a mixture of 1 to 10 equivalents of at least one polyol of 400 to about 6000 molecular weight and $1 \times 10^{-3}$ to 1 equivalents of polyamine, said mixture having been reacted with at least $1 \times 10^{-2}$ to no more than 2 equivalents of an organic polyisocyanate at a temperature of 32° to 82° C. to form insoluble micelles, said micelles being capable of disappearing not to reappear upon heating above 90° C.

2. A curative component for a two component isocyanate or polyurethane adhesive composed of 1 to 10 equivalents of at least one polyol of 400 to 6000 molecular weight and $1 \times 10^{-3}$ to 1 equivalents of a diamine being reacted with an organic diisocyanate to form micelles exhibiting very strong urea peaks and weak urethane peaks upon examination with NMR.

3. The curative of claim 1 wherein the polyamine contains from 2 to about 12 carbon atoms.

4. The curative of claim 3 wherein the polyamine is an aliphatic diamine.

5. The curative of claim 1 wherein the organic polyisocyanate is selected from the class consisting of toluene diisocyanate, methane di(phenyl isocyanate), hydrogenated methane di(phenyl isocyanate), hexane diisocyanate, and isophorone diisocyanate.

6. The curative of claim 1 wherein the polyol is a diol.

7. A polyurethane adhesive composed of 1 to 4 parts of a prepolymer component and 1 part of a curative formed by a mixture of 1 to 10 equivalents of at least one polyol of about 400 to about 6000 molecular weight and $1 \times 10^{-3}$ to 1 equivalent of diamine with at least part of said polyol and diamine being reacted with an organic diisocyanate to form micelles which exhibited very strong urea peaks and weak urethane peaks upon examination with NMR.

* * * * *